Feb. 16, 1971     R. R. DIVIS     3,563,839
METHOD OF FORMING WEAKENED TEAR LINES AND THE
ARTICLE FORMED THEREBY

Filed Aug. 1, 1968     3 Sheets-Sheet 1

INVENTOR
Roy R. Divis

INVENTOR
Roy R. Divis

United States Patent Office 3,563,839
Patented Feb. 16, 1971

3,563,839
METHOD OF FORMING WEAKENED TEAR LINES AND THE ARTICLE FORMED THEREBY
Roy R. Divis, Leominster, Mass., assignor to Foster Grant Co., Inc., Leominster, Mass., a corporation of Delaware
Filed Aug. 1, 1968, Ser. No. 749,444
Int. Cl. B32b 5/18, 31/26
U.S. Cl. 161—57      4 Claims

ABSTRACT OF THE DISCLOSURE

The method of providing weakened tear lines in heat-destructible material by thermally destroying a portion of the thickness of the material along desired paths.

---

This invention relates in general to heat destructible material such as plastic foam, and more particularly, this invention relates to a method of providing in such material lines of weakening along a predetermined path or paths for separating pieces of the material.

The method according to this invention is particularly applicable in the field of thermoplastic foam mesh material which is formed from a network of intersecting strands of the material. Such material may be conveniently formed from a circular extruder nozzle having a pair of counter-rotating elements, which is known in the art. The intersections of the network are often integrally extruded, but networks of thermoplastic foam material in which the intersections are fused or adhesively connected are also contemplated within the scope of this invention.

Accordingly, it is an object of this invention to provide a method of forming one or more paths in heat destructible material, especially thermoplastic foam mesh material, along which pieces thereof may be separated.

It is a further object of this invention to provide such a method which may be carried out in an efficient and economical manner.

Such foam material is generally produced commercially in the form of a continuous network, and subsequently put into rolls. In some applications of this material it is desired to provide the length, the width, or perhaps both the length and width with lines along which pieces of predetermined sizes may be separated from the roll. Considerable difficulty is encountered when trying to tear or separate the material because the line of tear tends to follow a strand of the material, most likely in an undesirable direction.

Conventional methods of providing weakened lines for tearing are inappropriate for use with material of this nature. The foam material does not lend itself to cutting or scoring a portion of the thickness of the material, basically because of its natural compressability.

The present invention provides a method of forming lines or paths across the network strands which make up the material along which separation will occur upon application of external tensile force in a direction tending to pull the material apart at the weakened line. According to this invention, the plastic foam strands are thermally destroyed through only a portion of their thickness, along a predetermined path of desired separation. The partial destruction by thermal means of the strands is small enough so that the net-like material holds together under normal conditions, and does not come apart except when an external force is applied. Separation of a piece of the material is much like tearing material such as paper along a score line or a perforated line.

It is not necessary that a path be chosen at any particular position with respect to the intersection of the strands. The path of partial destruction may pass over intersections or between them; thus, random selection of a path is possible. For best results, at least about 25% and preferably between 30% and 90% of the thickness is destroyed.

The thermal destruction of one or more paths in the material may be accomplished by bringing a heated element such as, for example, a wire, bar or disc into close proximity with the material along the path of desired separation. A section of the material may be held stationary while a heated element is held close to the material for a period of time long enough to partially destroy a portion of the thickness of the material adjacent the wire. If it is desired to work on the material while it is being advanced, suitable machinery may be used. For example, a heated element which may conveniently be mounted on a rotating roll for movement adjacent the material which is being handled, may be used for producing the transverse lines of partial material destruction. One or more heated elements similarly heated may be used for producing longitudinal lines along a moving piece of the thermoplastic foam material. Heat may be provided by any convenient means such as, for example, by providing suitable electrical heaters in the elements.

With the above and other objects in view, in the invention comprises the several steps, sequences, devices, combinations, and arrangements of parts hereinafter set forth and illustrated in the accompanying drawings, from which the several features of the invention and the advantages attained thereby will be readily understood.

Figure 1:
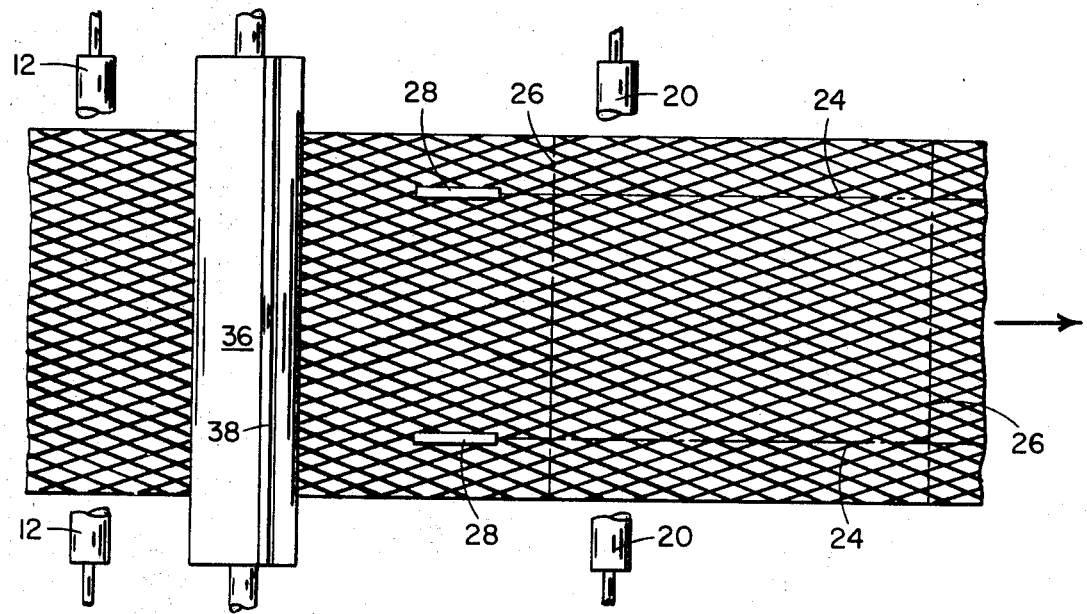
FIG. 1 is a diagrammatic plan view of one means for carrying out the process according to my invention.
Figure 2:
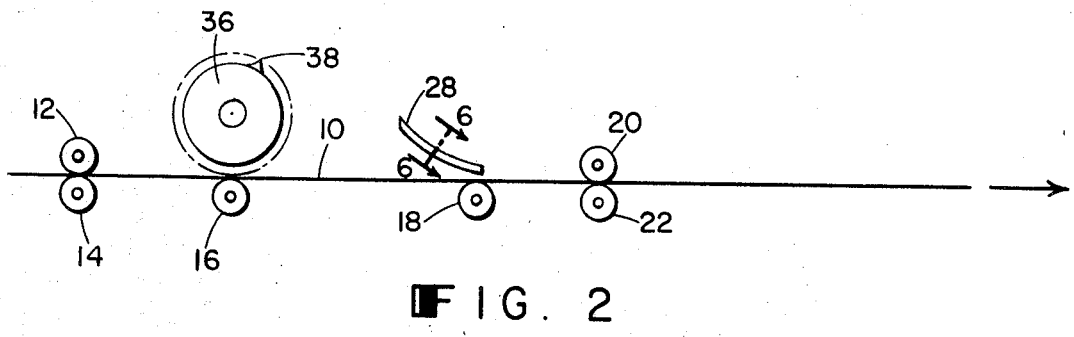
FIG. 2 is a diagrammatic elevational view of the apparatus shown in FIG. 1.
Figure 6:
FIG. 6 is a sectional view taken along line 6—6 of FIG. 2.

Referring to the drawings, FIGS. 1 and 2 illustrate in diagrammatic form apparatus which may be used if it is desired to work on a traveling piece of material. A piece of thermoplastic foam mesh material 10 of indefinite length is being moved longitudinally in the direction of the arrow. The material 10 may be, for example, expanded polystyrene. To support and to keep the material 10 in a substantially flat plane, a series of rollers 12, 14, 16, 18, 20 and 22 may be used.

For purposes of illustration, both longitudinal lines 24 and transverse lines 26 of partial destruction are shown being provided in the material 10, in FIGS. 1 and 2. Although straight lines are shown, they could be curved in any desired manner. In some instances it may be desired to use only a longitudinal line 24, or a transverse line 26, or one of each.

For providing the longitudinal lines 24, there may conventionally be provided one or more heated elements such as discs, wires or bars positioned adjacent the material. In the case of a disc, one or more may easily be mounted on a rotatable shaft. As the material 10 passes adjacent the elements 28, which in the illustration are bars, heat will be directed thereto along the concentrated paths or lines 24. It is not desirable for the elements 28 to actually come in contact with the material 10, as heat radiated from the elements 28 will be sufficient magnitude to destroy or melt a portion of the thickness thereof. By spacing the heated elements from the work piece, total destruction of the thickness can be prevented. Also, the heated elements are not fouled by melted material.

For providing the transverse lines 26 of partial destruction, apparatus may be used such as illustrated in FIGS. 1 and 2, i.e., a rotary shaft 36 having a blade 38 mounted on its periphery and extending in a longitudinal direction. Rotation of shaft 36 may be synchronized with the speed of the material 10 so that the linear speed of the blade 38 and material 10 are substantially the same. The blade 38 is also heated by conventional means. Of course, several blades may be mounted in the shaft 36 depending on the desired spacing of the transverse lines 26.

Figure 3:
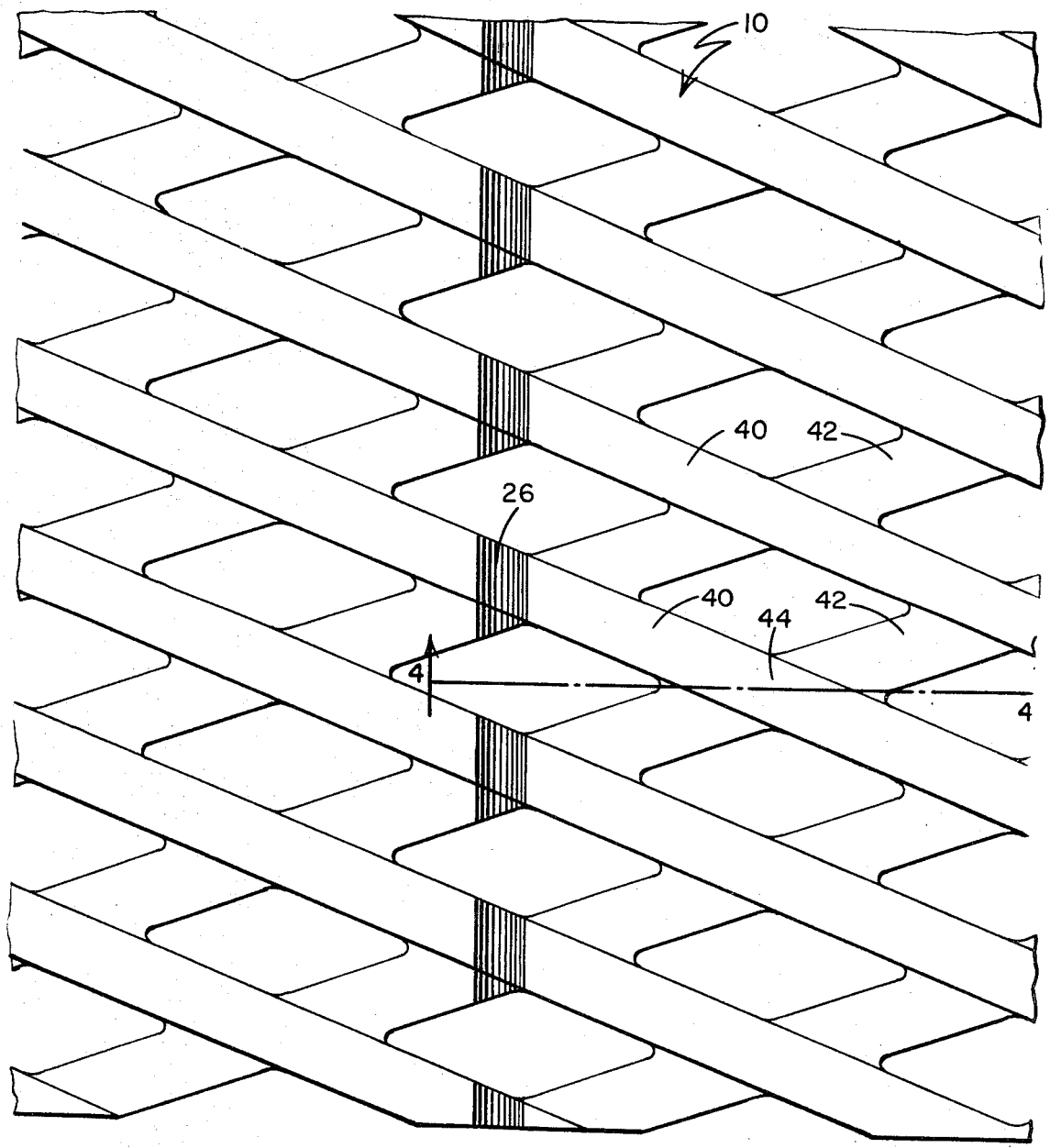
FIG. 3 is an enlarged plan view of the thermoplastic foam material made up of a network of strands.
Figure 4:
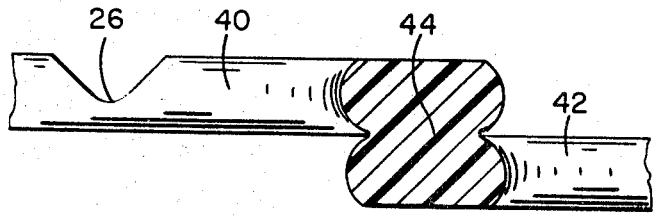
FIG. 4 is a section view taken substantially along the lines 4—4 of FIG. 3.
Figure 5:
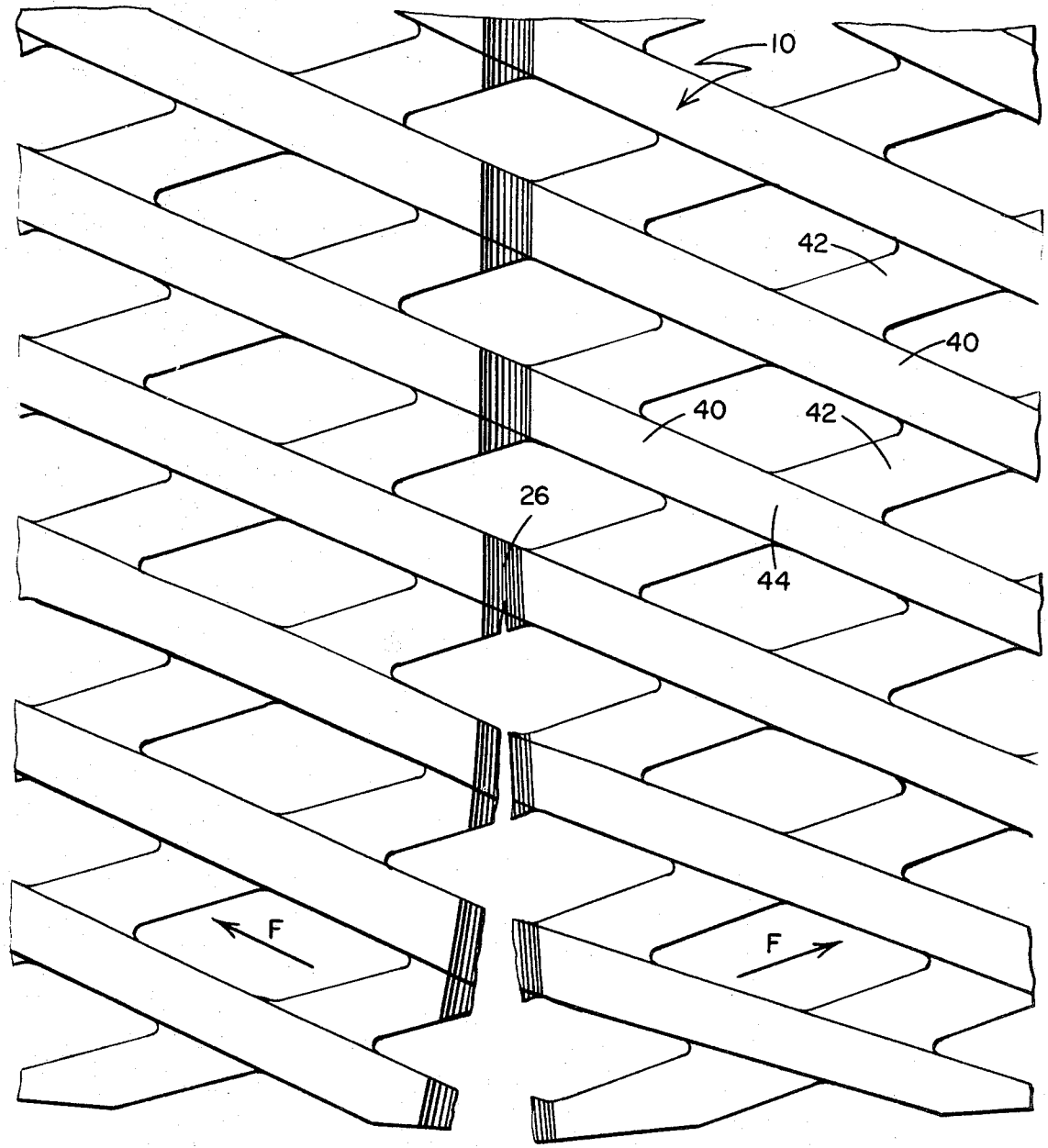
FIG. 5 is a plan view similar to FIG. 3, but showing the material being separated along a predetermined path.

In FIGS. 3, 4 and 5, there are shown enlarged illustrations of the material 10 having a transverse line 26 of partial destruction for separation of the material. For the sake of simplicity, only a single transverse line 26 is illustrated. The material 10 is made up of a network of intersecting strands of thermoplastic foam material. Strands 40 are spaced and are substantially parallel to each other and cross strands 42, which also are spaced and substantially parallel. The strands 40 cross strands 42 at intersections 44. The transverse line of partial destruction 26 extends across the network of material 10 and each of the strands 40 and 42 which cross this line are partially thermally destroyed. As best shown in FIG. 4, the destruction is only partly through the thickness of the strands so that the material 10 holds together under normal conditions. The degree of destruction will depend upon certain variables such as density of the thermoplastic foam, kind of foam material, size of strands, spacing of the strands, intensity of heat applied and time of heat application. In FIG. 5, the material is shown being separated along line or path 26 by application of external forces F in the direction indicated by the arrow. It should be understood that instead of providing the lines of partial destruction on only one side of the material, both sides may be partially destroyed by using this process.

EXAMPLE

A polystyrene foam material in the form of a mesh or network of intersecting strands having the following properties is provided with a line of partial destruction according to this invention:

Strand density—2.2 lbs. per cubic foot
Bulk density—1.2 lbs per cubic foot
Strand size—Slightly less than 0.2 inch average diameter
Spacing of strands:
    inch between centers of intersections in machine direction
    ½ inch between centers of intersections in transverse direction
Width of material—24 inches A 26 inch length of "Nichrome" 0.02 inch in diameter, and having a resistance of 1.002 ohms per foot is stretched across the width of material. Spacing between the wire and material was 0.01 inch minimum. A voltage of between 5 and 6 volts was applied for 0.5 second. A suitable path of partial material destruction was found to result.

It will be understood that various changes in the details, materials, steps, and arrangements of parts, which have been herein described and illustrated in order to explain the nature of the invention, may be made by those skilled in the art within the scope of the invention as expressed in the appended claims.

I claim:

1. The method of producing a path in a heat destructible thermoplastic foam mesh material, along which said material may be separated regardless of the position and relative direction of the strands thereof by application of external tensile forces which comprises thermally destroying a portion of the thickness of the thermoplastic foam strands making up said mesh material in a predetermined path along which it is desired to separate said material, said thermal destruction being of sufficient magnitude to permit separation along said path upon application of external force while leaving said path of partial thermal destruction strong enough to prevent inadvertent separation of said material.

2. Thermoplastic foam mesh material comprising rows of intersecting strands of expanded thermoplastic foam material connected at intersections thereof and having at least one predetermined path along which said material may be separated produced therein by the method of claim 1.

3. The method of forming a weakened tear path in a thermoplastic foam mesh material which comprises the steps of:
    (a) bringing a heated element into close, noncontacting relation with said material along a predetermined path of desired weakening, said element providing sufficient heat to destroy said material through at least part of its thickness, and
    (b) allowing said element to remain in close relation with the material a sufficient time to destroy between about 30% to about 90% of the thickness of said material along said path.

4. Thermoplastic foam mesh material comprising rows of intersecting strands of expanded thermoplastic foam material connected at intersections thereof and having at least one weakened tear path produced therein by the method of claim 3.

References Cited

UNITED STATES PATENTS

| 2,575,259 | 11/1951 | Cox et al. | 264—321X |
| 2,878,153 | 3/1959 | Hacklander | 161—159UX |
| 3,006,793 | 10/1961 | Wheeler | 156—82X |
| 3,222,437 | 12/1965 | Schilling | 260—2.5X |
| 3,274,047 | 9/1966 | Sloan | 161—122X |
| 3,328,505 | 6/1967 | Spencer | 264—321 |
| 3,392,080 | 7/1968 | Mercer | 161—124X |
| 3,454,168 | 7/1969 | Cahn | 211—134 |

WILLIAM A. POWELL, Primary Examiner

U.S. Cl. X.R.

156—155, 250; 161—109, 123, 124, 140; 264—321